July 12, 1927.
J. BOUCK
1,635,814
AUTOMOBILE ATTACHMENT
Filed Jan. 25, 1926
2 Sheets-Sheet 1
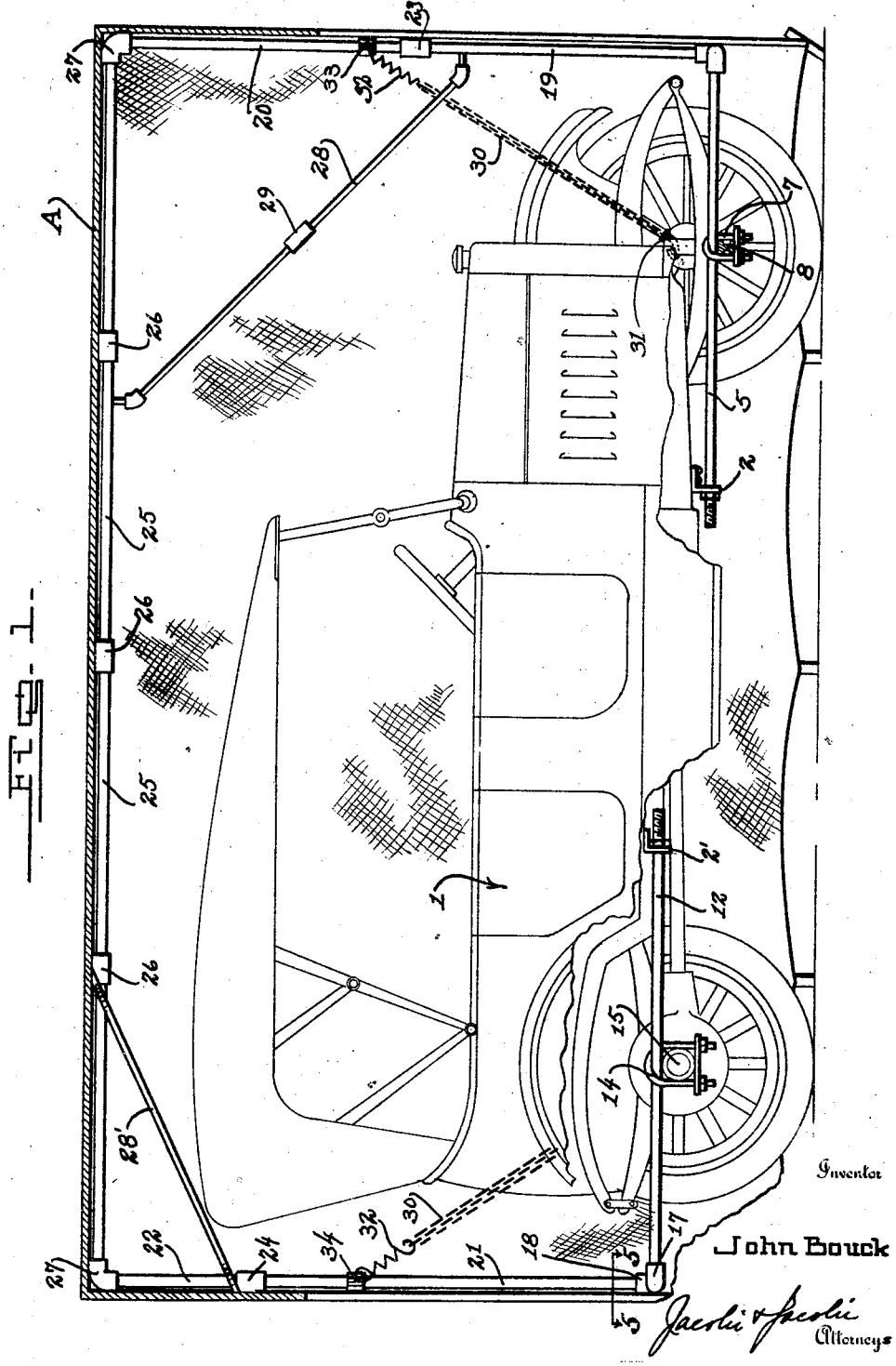
Inventor
John Bouck
Jacobi & Jacobi
Attorneys July 12, 1927.
J. BOUCK
1,635,814
AUTOMOBILE ATTACHMENT
Filed Jan. 25, 1926
2 Sheets-Sheet 2
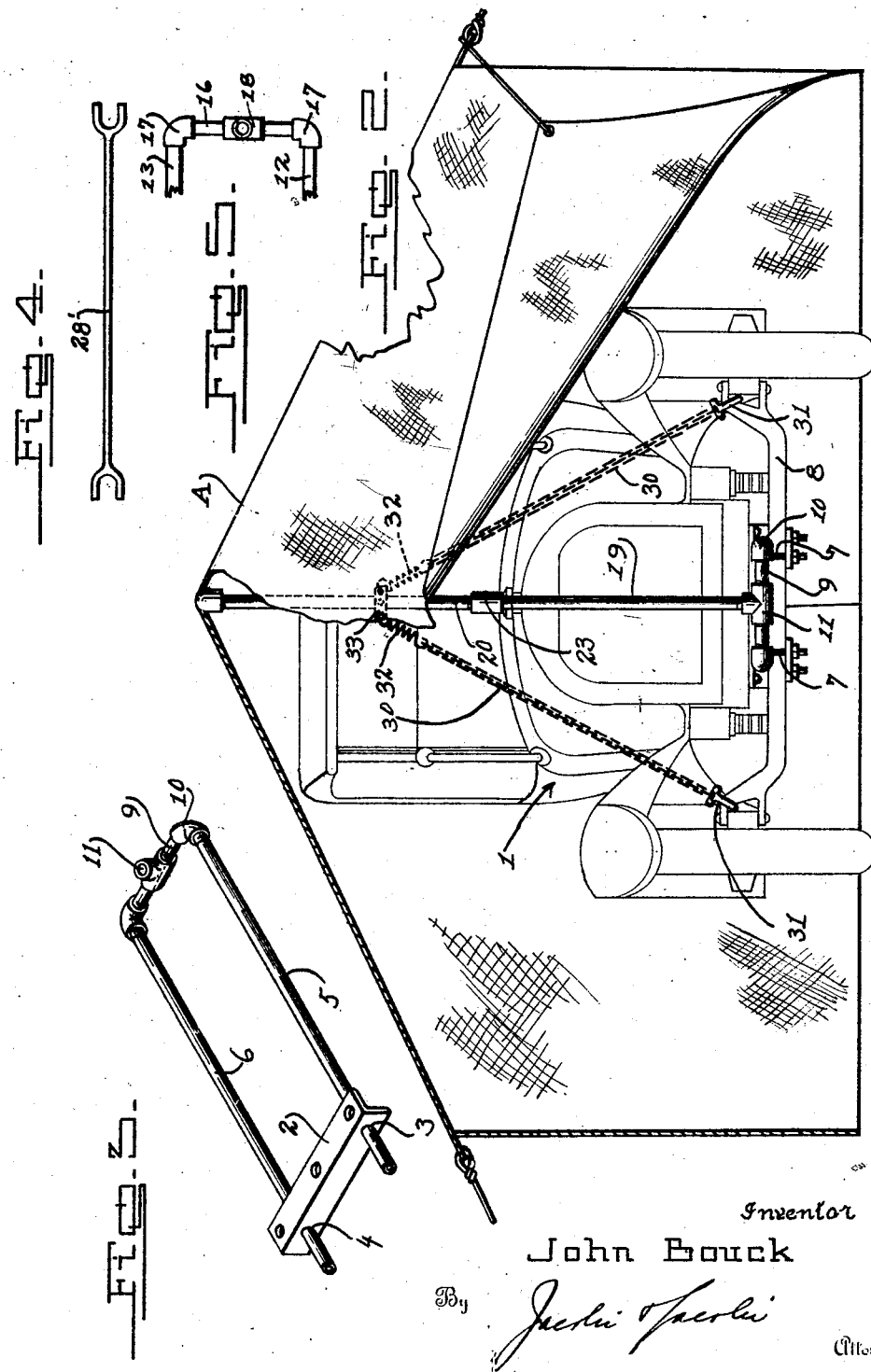
Inventor
John Bouck
By
Jackli & Jackli
Attorneys Patented July 12, 1927.

1,635,814

UNITED STATES PATENT OFFICE.

JOHN BOUCK, OF AKELY, OF MINNESOTA.

AUTOMOBILE ATTACHMENT.

Application filed January 25, 1926. Serial No. 83,662.

This invention relates to an automobile attachment and more particularly to a canopy which is adapted to be supported upon a frame detachably mounted upon the vehicle and adapted to extend thereover.

Another important object of the invention is to provide an automobile attachment of the above mentioned character, wherein means is provided for enabling the same to be detachably mounted in position upon the vehicle in order to permit the attachment to be readily and easily placed into position for use whenever desired.

Another important object of the invention is to provide an automobile attachment of the above mentioned character, which is of such a construction as to enable the vehicle to be operated without any interference of the attachment while the vehicle is in operation and thereby enable the attachment ready for use at all times.

A still further object of the invention is to provide an automobile attachment which may be conveniently carried by the vehicle when disassembled and will not consume considerable space or further add to the weight of the vehicle.

A still further object of the invention is to provide an automobile attachment of the above mentioned character which is simple in construction, inexpensive, strong, durable and further well adapted for the purposes for which it is designated.

Other objects and advantages of this invention will become apparent during the course of the following description.

In the accompanying drawings forming a part of this specification and in which like numerals designate like parts throughout the same:—

Figure 1 is a side elevation of an automobile with my attachment in position thereon and parts of the attachment shown in section.

Figure 2 is an end elevation of the same.

Figure 3 is a detail perspective view of one of the supporting brackets.

Figure 4 is a plan view of the rear bracing element, and

Figure 5 is a transverse section taken on line 5—5 of Fig. 1.

In the drawings wherein for the purpose of illustration is shown the preferred embodiment of my invention, the numeral 1 designates an automobile which is of the well known construction and adapted to be supported on the underside of the automobile frame and preferably at a point adjacent the transmission housing is the angle iron 2. This angle iron 2 is supported upon the bottom of the automobile in any suitable manner and the downwardly extending portion of the angle iron 2 is provided with apertures 3 and 4 adjacent the ends thereof for the purpose to be more fully described. Extending through the apertures 3 and 4 provided in the angular plate 2 are the inner ends of suitable supporting members 5 and 6 respectively.

These supporting members 5 and 6 are preferably formed of tubular material or metal piping and have their outer ends extending through suitable brackets 7 carried by the front axle 8 of the vehicle and extend a substantial distance beyond the front of the vehicle in the manner as more clearly shown in the Fig. 1 of the drawings. The outer ends of the supporting members 5 and 6 are threaded and are connected to a short section of piping designated by the numeral 9 by means of the elbow connection shown at 10 in the drawings. This transversely extending section of piping 9 is provided at its central portion with an upstanding threaded member shown at 11 in the drawings thereby forming a T connection between the outer free ends of the supporting members 5 and 6.

A similar angle iron 2' is secured to the bottom of the vehicle and at a point spaced from the first mentioned angle iron 2 and is also provided with spaced apertures in the downwardly extending portion thereof for the purpose of receiving the inner ends of the supporting members 12 and 13 respectively the latter being of the same construction as the supporting members 5 and 6 heretofore described. The outer ends of the supporting members 12 and 13 also are adapted to extend through suitable brackets 14 which are mounted upon the rear axle housing 15 and extend beyond the rear end of the vehicle in the manner as more clearly shown in Fig. 1 of the drawings. The outer ends of the supporting members 12 and 13 are also externally threaded and are connected by the transverse pipe section 16 by means of the couplings or elbows 17 in a manner similar to that in which the outer ends of the supporting members 5 and 6 are secured to the transverse section of piping 9. The transverse section of piping 16 is also provided with a centrally upstanding threaded portion 18 for the purpose to be more fully described.

To prevent the accidental displacement of the supporting members 5 and 6 and the supporting members 12 and 13 from the angle bars 2 and 2' respectively, the inner ends of the supporting members may be threaded and a cap or head may be threaded thereon and will abut the inner faces of the angle bars and thereby prevent the inner ends of the supporting members from becoming disengaged from their supported position.

Connected to the upper threaded ends of the upstanding portions 11 and 18 respectively on the transverse sections of piping 9 and 16 are the vertically extending tubular units 19 and 20 and 21 and 22 respectively. Any number of units may be used in conjunction with my invention and the number of units used depends upon the length of each unit. In the present instance I have shown two units although it is to be understood that I do not wish to confine myself to any particular number of units so used. These units are detachably connected to each other by means of couplings 23 and 24 respectively and the lower ends of the vertically extending members are secured to the upstanding threaded portions 11 and 18 in a similar manner. It will be further seen from the drawings that the vertically extending members are so positioned and arranged with respect to the supporting members therefor as to cause the vertically extending members to be located centrally in the front and rear of the vehicle.

The upper ends of the vertically extending members are adapted to extend above the top of the vehicle and are connected to each other by means of the horizontally extending sections of piping 25 which are connected by means of the coupling 26 and are connected at their ends to the upper ends of the vertically extending members by means of the elbows 27 in the well known manner. The purpose of having the longitudinally extending connecting member formed in units similar to that in which the vertically extending members are formed is to provide a means whereby any number of units may be used in order to accommodate the use thereof to any desired length of vehicle. Furthermore, it is to be understood that the horizontally extending connecting means is arranged above the top of the vehicle in the manner as shown in Fig. 1 of the drawings and extends longitudinally thereover in the central portion thereof.

A brace designated by the numeral 28 in the drawings and which consists of detachably connected pipe sections held together by means of the coupling 29 is secured at one end to the longitudinally extending connecting member and at its opposite end to the vertically extending member located at the front of the vehicle. This will have a tendency to support the central portion of the horizontally extending connecting member and will also brace the same thereby making the frame rigid. It is to be further understood that such auxiliary braces may be used in conjunction with the vertically extending members and the horizontal connecting means for further facilitating the proper supporting of the sections and making the frame more rigid.

The rear portion of the frame is braced by means of the brace 28' shown in Fig. 4, and this brace 28' is forked at its ends to permit the same to extend between the unit 22 and the horizontal section 25 in such a manner as to cause the forked ends of the brace to engage the couplings 24 and 26 as clearly shown in Fig. 1.

As an auxiliary means for supporting the frame in proper position when the vehicle is moving, I provide the chains, ropes or straps 30 which have hooks 31 in the lower ends thereof for connection with the axle and the opposite ends of these chains are each provided with coil springs 32 and are also adapted to carry at their outer ends the connecting means 33. The connecting means 33 being adapted to be connected to a bracket 34 mounted on the vertically extending members in any well known manner such as providing eyes in the bracket 34 for receiving the connecting means 33. With a construction of this character, the vertically extending members will also be braced and will be prevented from lateral movement while the vehicle is in operation and which would consequently result in the destruction of the frame as well as a considerable amount of unnecessary noise and jarring.

When the frame is in position as shown in Fig. 1 of the drawings, a suitable canopy or cover designated by the letter A is adapted to extend over the entire frame and will completely cover the vehicle on the top, ends and the sides thereof in the manner as will provide a housing for the interior of the car, the lower portion 7 of the canopy A being adapted to be secured in position by driving stakes into the ground as shown in Fig. 2. This is especially adapted for use by tourists or the occupants of the vehicle when they desire to camp and will greatly add to the comfort of the occupants of the vehicle as a protector against rain, when they are camping and also as a curtain for the vehicle when the vehicle is used as a bed.

The simplicity of my device enables the same to be readily disassembled when not desired to be carried on the vehicle and may be easily taken apart and placed against the tool chest carried on the vehicle or otherwise left on the vehicle and will not interfere with the operation thereof. Furthermore, far more time and labor is saved by providing a canopy support of the above mentioned character than those now in use and does not require the loss of time in setting up the frame for use.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

1. A canopy for vehicles including a frame, the latter comprising angle bars secured to the underside of said vehicle adjacent the front and rear portions thereof, horizontally extending members mounted in said angle bars and having their outer opposed ends extending through brackets mounted upon the axle of said vehicle and beyond the front and rear portions thereof, T-shaped members extending transversely across the outer free ends of said supporting members, vertically extending members carried by said T-shaped members, a horizontally extending connecting member supported by the upper ends of said vertical members and extending longitudinally over the top of said vehicle, braces therefor, and a covering supported by said frame and extending over said vehicle.

2. A canopy for vehicles including a frame, the latter comprising angle bars secured to the under side of said vehicle adjacent the front and rear portions thereof, horizontally extending members mounted in said angle bars and projecting beyond the front and rear portions respectively of said vehicle, connecting members extending transversely across the free ends of said horizontal members, vertically extending members carried by said connecting members, a horizontally extending member connecting the upper free ends of said vertical members and extending longitudinally over the top of said vehicle, braces between said last mentioned vertical and horizontal members and a covering supported by said frame and extending over said vehicle.

3. A canopy structure for a vehicle body comprising a vertical member mounted in the vicinity of one end of the body, a frame secured to the under side of the body in the vicinity of the opposite end thereof and having a portion extending beyond the adjacent axle of the vehicle, a vertical member mounted upon the extension portion of said frame, a horizontally extending member connecting the upper end of said vertical members and extending longitudinally over the top of the body, braces between the horizontal and vertical members and a covering supported by said members and extending over the body.

In testimony whereof I affix my signature.

JOHN BOUCK.